United States Patent Office 2,695,315
Patented Nov. 23, 1954

2,695,315

SYNTHESIS OF OXYGENATED ORGANIC COMPOUNDS

Paul T. Parker, Baton Rouge, La., assignor to Standard Oil Development Company, a corporation of Delaware No Drawing. Application October 7, 1950,
Serial No. 189,060

1 Claim. (Cl. 260—604)

The present invention relates to the preparation of oxygenated organic compounds by the reaction of olefins with hydrogen and carbon monoxide and more specifically to improved catalysts for processes of this type. In particular, the invention refers to improved catalysts comprising aqueous solutions of water soluble inorganic or organic salts of metals promoting the conversion of olefins with hydrogen and carbon monoxide into oxygenated compounds such as aldehydes and ketones. The present application is a continuation-in-part of Serial No. 749,337, filed May 20, 1947, now abandoned.

It is well known in the art that oxygenated organic compounds may be synthetized from olefins or diolefins by a reaction with carbon monoxide and hydrogen in the presence of catalysts containing cobalt, iron, nickel or the like in a two step process in which predominantly aldehydes and minor proportions of alcohols are formed in a first step in the presence of the catalysts mentioned above and the product from the first step is hydrogenated in a second step to convert aldehydes into the corresponding alcohols. The catalyst used in the first stage may be employed in the second stage. However, other known hydrogenation catalysts may be used in the latter stage such as metallic nickel, tungsten, groups V and VI metal oxides and sulfides, etc. The catalyst for the first stage may contain promoters such as thoria, copper, magnesia and the like.

The alcohols produced by this process normally contain one more carbon atom than the olefin used as the starting material, the position of the added hydroxyl group depending on the position of the double bond in the olefins. The olefins to be used as starting material may therefore be selected as a function of the purpose for which the product alcohol is desired.

Alcohols prepared by this process may be used for many purposes such as solvents, anti-foam agents, etc., or they may be esterified or sulfonated to produce plasticizers, detergents, wetting agents, etc. For example, a detergent such as sodium lauryl sulfate may be prepared from an olefin such as undecene-1 by the alcohol synthesis. Other olefins and diolefins such as ethylene, propylene, butylene, pentenes, hexenes, butadiene, pentadienes, olefin polymers such as di-isobutylene, tri-isobutylene, polypropylenes and olefinic fractions from the hydrocarbon synthesis process, thermal or catalytic cracking operations, and other sources may be used as starting material depending on the nature of the aldehydes and alcohols desired.

The olefin feed may comprise pure olefins or hydrocarbon mixtures containing olefins. In general, olefins having from 2 to 18 carbon atoms in the molecule are preferred.

The synthesis gas mixture containing hydrogen and carbon monoxide may be produced from any conventional sources such as carbonaceous solids or gases in any manner known per se and in any desired ratio of hydrogen to carbon monoxide. Ratios of 0.5 volume of hydrogen to 4.0 volumes of hydrogen per volume of carbon monoxide may be employed, about 1.0 volume of hydrogen per volume of carbon monoxide being preferred. The reaction of the olefins with $H_2$ and $CO$ is generally conducted at pressures in the range of about 100 to 300 atmospheres and temperatures in the range of about 150° to 450° F.

The quantity of $H_2+CO$ with respect to olefins used may vary within wide ranges, for example, from 1,000 to 45,000 cu. ft. of $H_2+CO$ per barrel of olefin feed. In general, approximately 2,500 to 15,000 cu. ft. of $H_2+CO$ per barrel of olefin feed is employed. In the hydrogenation step temperatures are generally within the range of from about 150° to 450° F. and pressures within the range of about 100 to 300 atmospheres.

The catalyst for the first stage of the process is usually employed in the form of salts of the catalytically active metal with high molecular weight fatty acids such as stearic, palmitic, oleic or higher acids of natural or synthetic origin. These salts are soluble in the liquid olefin feed and may be supplied to the reaction zone in the form of hydrocarbon solutions. However, this method has various serious drawbacks the most serious of which resides in the fact that the liquid product from the first stage must be specially treated to recover the catalyst for reuse such as by acid washing or thermal hydrogenation followed by appropriate chemical operations for the conversion of the catalyst to usable form. Also, the higher fatty acid salts suffer from the disadvantage that they have a low percentage of metal and are relatively expensive.

It is therefore been suggested to use the catalyst in the form of aqueous solutions of metal salts which are capable of forming metal carbonyl hydrides. These catalyst solutions are insoluble in the hydrocarbon feed and the desirable high-molecular oxygenated product and may be recovered from the latter by settling without distillation.

However, the preparation of these aqueous catalyst solutions as taught by the prior art is highly complicated. Prior to the present invention, the catalytic metal component in any suitable form has been mixed with walter and saturated hydrocarbons and/or fatty acids or soaps and the mixture has been subjected to a treatment with water gas for about 15 to 20 hours to produce the desired carbonyl hydrides for the olefin conversion. These catalysts also had to be employed in extremely large proportions of at least equal volumes of aqueous catalyst based on the liquid olefin feed.

The present invention overcomes these difficulties and affords various additional advantages.

It has been found that water soluble inorganic and organic salts of cobalt, iron and nickel such as chlorides, nitrates, iodides, bromides, propionates, acetates, benzoates and naphthenates, etc. may be used in the form of their aqueous solutions as catalyst for the conversion of olefins with $H_2+CO$ into oxygenated compounds without the addition of other materials such as the organic substances mentioned above and without any pretreatment with carbon monoxide and hydrogen, when the solutions contain a high concentration of the metal salts and are employed as catalyst in small amounts based on the liquid olefin feed. Aqueous solutions of water soluble salts of iron, cobalt and nickel, containing up to 50% of metal salt may be applied in proportions of about 5%, preferably 0.2 to 3% of the liquid olefin feed. The conventional conditions described above as suitable for the conversion of olefins with hydrogen and carbon monoxide into oxygenated compounds may be employed in connection with the catalysts of the present invention.

The process carried out in the presence of catalyst prepared in accordance with the invention affords satisfactory yields of desirable products as will appear more clearly from the following specific examples.

EXAMPLE I

A catalyst solution was prepared by dissolving 1.5 gms. of $CoCl_2 \cdot 6H_2O$ in 4.5 cc. of water. The solution formed was added to 353.2 gms. of di-isobutylene. The mixture was charged to a high pressure autoclave and reacted with a gas mixture containing hydrogen and carbon monoxide in the ratio of 1.2:1, at a pressure of 3000 lbs. per square in. and a temperature of 275° F. for 5 hours. After this time the autoclave was cooled and the charge was withdrawn. The product had the following inspection characteristics:

Hydroxyl No _____ 36
Carbonyl No _____ 292
Saponification No _____ 25
Acid No _____ 2.3

The product was hydrogenated over a nickel-on-kieselguhr catalyst containing about 60% nickel for 12 hours at 350° F. and 2700 lbs. per square in. hydrogen pressure. The product was distilled and the distillation showed that 84% of the original olefin feed had been converted to oxygenated compounds. The yield of $C_9$ alcohols was 64% based on the olefin feed which is equivalent to an alcohol selectivity of 77%.

EXAMPLE II

An iron catalyst was prepared by dissolving 2.48 gms. of $FeCl_3.6H_2O$ in 15.0 cc. of water. This solution was added to 359.5 gms. of di-isobutylene and the mixture was reacted with carbon monoxide and hydrogen at the conditions specified in Example I. The product showed the following inspection values:

Hydroxyl No _____ 0
Carbonyl No _____ 233
Saponification No _____ 42
Acid No _____ 27.5

When this product is hydrogenated over the nickel-on-kieselguhr catalyst and at the hydrogenation conditions specified in Example I, a product may be obtained which contains about 59 mole per cent of $C_9$ alcohols based on original olefin feed, amounting to an alcohol selectivity of 82% and corresponding to a total olefin conversion of 72%.

While the above examples specify a batch procedure it should be understood that continuous operation may be employed at otherwise similar reaction conditions provided that care is taken for maintaining the aqueous catalyst solutions thoroughly mixed and evenly distributed throughout the liquid olefin feed being reacted. This may be expedited by the addition of small amounts of emulsifiers such as salts of alkyl aryl sulfonic acids. Other water-soluble salts of iron and cobalt than those used in Examples I and II may be applied in a generally analogous manner as will be understood by those skilled in the art. Actually all water soluble salts of any metals promoting the conversion of olefins with carbon monoxide and hydrogen to form oxygenated compounds may be used to advantage for the purposes of the invention.

While the above examples have shown the excellent yields of alcohols obtained when aqueous solutions of cobalt or iron salts are employed in the aldehyde synthesis reaction, nonetheless the water solutions do not have the high reaction rates that the fatty acid salts of cobalt have for this process. This is of particular importance when a continuous operation is employed, for low reaction rates mean low throughput rates.

It has been found however, that when a small amount of an emulsifier is added to the mixture of olefin and aqueous solution of catalyst compound, the reaction rate for formation of aldehydes is greatly increased and brought to the same order of magnitude as when a hydrocarbon-soluble compound is employed.

EXAMPLE III

Technique

Reactions were carried out with 350 gms. (3.6 moles) of a $C_7$ polypropylene fraction, and catalyst concentrations equivalent to 0.3 wt. per cent cobalt were used. The mixture was placed in a 3 liter stainless steel shaker autoclave, pressure tested cold with 1/1 $H_2/CO$ gas, depressurized to about 200 pounds, and the system heated to 350° F. Pressure was then increased to about 2700–2900 p. s. i. and the system blocked from the pressure source. Reaction was allowed to proceed and the pressure drop recorded as a function of time. Any induction period was noted. The time required for the pressure to drop from the initial value of 2800 p. s. i. to 2000 p. s. i. was used as a measure of the reaction rate, i. e. the rate index.

In the example below, there is shown the reaction rate of a saturated solution of cobaltous acetate in concentration of 2 vol. per cent in olefin, equivalent to about 0.3% by weight of cobalt. The emulsifier employed was a nonionic polyether alcohol known commercially as "Triton-X–100." For comparison, the reaction rate of cobalt metal is also included.

| Cobalt compound | Emulsifier conc., weight percent, in olefin | Induction period, minutes | Reaction rate index |
|---|---|---|---|
| Cobalt oleate | 0 | 2, 4 | 4, 7 |
| Cobalt metal | 0 | 5, 5 | 182, 192 |
| 2% cobalt acetate solution | 0 | 15 | 52 |
| Do | 0.15 | 10 | 35 |
| Do | 0.43 | 8 | 31 |
| Do | 0.71 | 4 | 13 |
| Do | 1.42 | 5 | 18 |
| Do | 2.15 | 6 | 19 |
| Do.[1] | 1.42 | 10 | 63 |

[1] Additional water (2%) added.

These data clearly indicate the effect of the emulsifier in decreasing both the induction period and the time required for pressure to drop from an initial value of about 2800 p. s. i. to 2000 p. s. i., which is an indicator of the relative reaction rate. The maximum effect was obtained by an emulsifier concentration of 0.7 wt. per cent—further addition appeared detrimental. Also, additional water with 1.4% emulsifier gave a reaction rate slower than was obtained without emulsifier, indicating that water concentration may be very critical.

Suspended cobalt, it will be observed, had a reaction rate of an entirely different order of magnitude from the cobaltous acetate, with or without emulsifier, while cobaltous acetate solution with critical amounts of emulsifier had a reaction rate comparable to the hydrocarbon soluble cobalt oleate.

Besides the emulsifying agent disclosed above, other emulsifying, wetting and dispersing agents, such as soaps, alkyl sulfates, sulfonates, glycol esters, sulfonated castor oil, monosulfates of mono-glycerides, alkyl aryl sulfonates, fatty acid esters, amine salts of fatty acids, and even distillation bottoms from the alcohol synthesis reaction itself may be employed.

When the aldehyde synthesis reaction is carried out continuously, it is customary to carry out the first stage in a reaction zone which contains no solid catalyst, the olefin feed being pumped directly to the reaction zone. The emulsion of the present invention may be added to the feed before entering the reaction zone, or the catalyst emulsion may be pumped directly to the reaction zone. The synthesis gas may advantageously be introduced into the reaction zone at a point below the level of the liquid through a high velocity jet, which method provides extremely intimate contact between the gas and the liquid phases, and also provides good agitation, with consequent good heat transfer between the reactants and the walls of the reactor. By directing the jet tangentially to the walls of the reactor, further improvements in both mixing and heat transfer may be realized, because of the swirling motion imparted to the liquid phase.

While the foregoing description and exemplary operations have served to illustrate specific applications and results of the invention, other modifications obvious to those skilled in the art are within the scope of the invention. Only such limitations should be imposed on the invention as are indicated in the appended claim.

What is claimed is:

The process for decreasing the induction period for the reaction between hydrogen, carbon monoxide, olefinic compounds and cobalt catalysts, which comprises passing an olefinic compound, carbon monoxide, hydrogen and approximately 2% aqueous solution of cobalt acetate and a polyether alcohol emulsifier into a reaction zone, the concentration of said emulsifier being in the range of about 0.15 to about 2% by weight based on olefin, maintaining said zone at temperatures of about 150 to about 450° F., and pressures of about 100 to 300 atmospheres and withdrawing an aldehyde product from said zone.

References Cited in the file of this patent

UNITED STATES PATENTS

| Number | Name | Date |
|---|---|---|
| 2,437,600 | Gresham et al. | Mar. 9, 1948 |

(Other references on following page)

UNITED STATES PATENTS

| Number | Name | Date |
|---|---|---|
| 2,449,470 | Gresham et al. | Sept. 14, 1948 |
| 2,564,104 | Gresham et al. | Aug. 14, 1951 |
| 2,576,113 | Hagemeyer et al. | Nov. 27, 1951 |
| 2,641,613 | Mertzweiller et al. | June 29, 1953 |

OTHER REFERENCES

"Oxo Process" patent applications of the I. G. Farbenindustrie Actiengesellschaft & Ruhrchemie Actiengesellschaft (Meyer translation from T. O. M. Reel 36, item 21 and part of item 36) deposited in Library of Congress April 18, 1946, chapt. 6, pages 12–13, R655, and chapt. 14, pages 35–37.

Hall et al., "Interrogation of Dr. Otto Roelen," published on July 18, 1947, page 64.